United States Patent [19]

Boursereau et al.

[11] Patent Number: 5,886,063
[45] Date of Patent: Mar. 23, 1999

[54] COMPOSITIONS OF MALEIC RESINS THAT CAN BE SET BY IONIZATION AND THEIR USE IN THE MANUFACTURE OF COMPOSITE MATERIALS WITH FIBROUS REINFORCEMENT

[75] Inventors: Frédéric Alexandre Lionel Boursereau, Le Bouscat; Patrice Dourthe, Begles, both of France

[73] Assignee: Aerospatiale Societe Nationale Industrielle, Paris Cedex, France

[21] Appl. No.: 807,635

[22] Filed: Feb. 27, 1997

[30]     Foreign Application Priority Data

Mar. 19, 1996 [FR] France ................................. 96 03395

[51] Int. Cl.⁶ .............................. C08F 2/46; C08L 79/08; D02G 3/00
[52] U.S. Cl. ................................ 522/71; 522/77; 522/81; 522/83; 522/120; 522/121; 526/262; 442/59; 428/375; 428/377
[58] Field of Search ..................... 522/120, 121, 522/71, 81, 77, 83; 526/262; 442/59; 428/375, 377

[56]         References Cited

U.S. PATENT DOCUMENTS 5,271,968  12/1993  Coyle et al. .
5,585,417  12/1996  Beziers et al. ...................... 522/120

FOREIGN PATENT DOCUMENTS 0 598 575  5/1994  European Pat. Off. .
2 672 898  8/1992  France .

*Primary Examiner*—Susan W. Berman
*Attorney, Agent, or Firm*—Oblon, Spivak, McClelland, Maier & Neustadt, P.C.

[57]          ABSTRACT

The invention relates to compositions of ionization-setting maleic resins and their use for manufacture of composite materials with a fibrous reinforcement. These compositions comprise a maleic resin and a reactive diluent made up of at lest one compound chosen from among dipentaerythritol pentacrylate and hydroxyethyl methacrylate, the total quantity of reactive diluent being between 10 and 70 parts by weight per 100 parts by weight of maleic resin. They may also comprise a plasticizer such as bis-allylic resin. With these compositions it is possible to obtain composite materials set by ionization without additional post heat treatment.

19 Claims, 2 Drawing Sheets

COMPOSITIONS OF MALEIC RESINS THAT CAN BE SET BY IONIZATION AND THEIR USE IN THE MANUFACTURE OF COMPOSITE MATERIALS WITH FIBROUS REINFORCEMENT

DESCRIPTION

This invention relates to compositions of maleic resins that can be set by ionization which can be used in particular for the production of items in composite materials with fibrous reinforcement having to resist high temperatures.

The composite materials to which the invention applies are materials made up of a resin and a reinforcement intended to give them particular properties. These materials consist in particular of a fibrous, mineral or organic reinforcement providing the products with resistance and rigidity, and of an organic matrix bonding together the reinforcement fibres and transferring stresses between said fibres. The reinforcement fibres are generally of glass, silica, carbon, carbides or carbonitrides of silicon, alumina or aramide.

These composite materials may be used in numerous industrial sectors, in particular in space, aeronautics, automobile, nautical industries and in the area of competitive sports. Generally, these composite materials may be used to produce light mechanical parts with high mechanical resistance.

The organic matrixes used for the production of composite materials are generally made up of a thermosetting resin, hardened under strong pressure and high temperatures requiring the use of an autoclave. (The setting of a resin corresponds to its polymerisation and/or its reticulation).

The processes for heat setting a resin give high performing composite materials from a mechanical viewpoint, but which have defects due to thermal effects such as critical inner stresses and delamination in thick mechanical parts. Also, polymerization time is extremely long, leading to heavy financial consequences in respect of investment and power consumption.

Setting methods by ionization using X rays or electrons are of interest as they permit polymerization and/or reticulation without any temperature rise. Therefore, composite materials of very high quality can be obtained in a relatively short time using relatively low energy levels. Also, these methods of cold setting are compatible with all types of fibres entering into the composition of composite materials.

The resins that can be polymerized by ionization which are frequently used in composite materials are resins with acrylic endings and more particularly epoxy resins with acrylic endings.

The known epoxy resins with the best performance from a mechanical and heat viewpoint have vitreous transition temperatures in the region of 200° C.; their use is therefore limited to low temperature applications, in particular below 180° C.

Maleic thermosetting resins of bismaleimide type offer the advantage, in relation to epoxy resins, of having a high vitreous transition temperature, in the region of 300° C., allowing them to be used for high temperature applications (over 250° C.).

Documents FR-A-2 672 896 and U.S. Pat. No. 5,403,907 illustrate compositions of maleic thermosetting resins, that can be set by ionization, and are suitable for the production of composite materials. These compositions comprise a basic maleic resin obtained by reaction of various constituents, and they may be hardened by ionization after adding thereto 10 to 50 parts by weight, per 100 parts by weight of resin, a reactive diluent made up in particular of N-vinylpyrrolidone.

Setting by ionization may be carried out with doses of 250 to 300 kGy, but for the manufacture of composite materials, this setting by ionization needs to be completed by additional post heat treatment at a temperature of 180° to 250° C. for 2 to 8 hours.

The need to carry out such treatment constitutes a disadvantage, especially for the manufacture of large-sized items owing to set-up difficulties which require treatment units of considerable size and involve high investment and energy costs.

The object of the present invention is precisely a maleic resin composition set by ionization which remedies this disadvantage.

According to the invention the ionization-setting composition comprises a maleic resin and a reactive diluent made up of at least one compound chosen from among dipentaerythritol pentacrylate and hydroxyethyl methacrylate, the total amount of reactive diluent being between 10 and 70 parts by weight per 100 parts by weight of maleic resin.

In this composition, the choice of diluents mentioned above allows the composition to be fully set by ionization, that is to say almost full conversion is obtained of the maleimide functions of the maleic resin, even when the latter is dispersed in a fibrous reinforcement of a composite material.

Therefore, for the production of composite materials comprising a maleic resin based matrix, it is no longer necessary to carry out additional post heat treatment of the material after setting by ionization.

The maleic resins used in the composition of the invention that can be set by ionization, are resins obtained from bismaleimide monomers. Advantageously, the maleic resins described in documents FR-A-2 672 896 and U.S. Pat. No. 5,403,907 are used.

A maleic resin of this type consists of the product resulting from the reaction of the following constituents:

(a) a N,N'-bis-maleimide with the formula:

in which:
the Z symbols, identical or different, each represent CH$_3$ or Cl;
the A symbol represents a single bond or a group chosen from among:
CH$_2$—; —C—(CH$_3$)$_2$—, —O—, —S—and —SO$_2$—;

(b) at least one maleimide chosen from among the compounds with the formulae:

(c) an acrylate reagent consisting of one or more compounds with the general formula:

$$(CH_2=CR_1-CO-O)_n\text{----}G \quad (II)$$

in which:

the $R_1$ symbol represents a hydrogen atom or the methyl group;

n represents a whole or fractional number of at least 1 and of no more than 8;

the G symbol represents a valence organic group, made up of a saturated aliphatic hydrocarbonated group, either linear or branched, having from 1 to 30 carbon atoms and possibly containing one or more oxygen atoms and/or one or more free hydroxyl functions; an aromatic group (of arylic or arylaliphatic type) having 6 to 150 carbon atoms made up of a benzene nucleus which may be substituted by one to three alkyl groups having 1 to 5 carbon atoms, or of several benzene nuclei possibly substituted by 1 to 3 alkyl groups with 1 to 5 carbon atoms, interconnected by a single bond, an inert group or an alkylene group having 1 to 3 carbon atoms, said aromatic group possibly containing at several points in its structure one or more oxygen atoms and/or one or more free hydroxyl functions, the free valence or valences of the aromatic G group possibly being carried by a carbon atom of an aliphatic chain and/or by a carbon atom of a benzene nucleus; and

(d) a reagent comprising a double vinyl bond chosen from among vinylpyridines, N-vinylpyrrolidone-2, vinyltetrahydrofuranne, styrene and their mixtures.

According to a preferred embodiment of the invention, a maleic resin of this type is used in which constituent (a) is 4,4'-diphenyl methane-bis-maleimide, constituent (b) is 1,3-toluene-bis-maleimide, constituent (c) is a mixture of the following acrylates:

the acrylate with the formula:

the acrylate with the formula:

the triacrylate of propane trimethylol,
and constituent (d) is 1-vinyl-2-pyrrolidone.

The reactive diluents used in the setting resins of the invention have good properties for use in the production of composite materials.

For such production, the fibrous reinforcement is generally impregnated with the hardening composition in liquid state; this composition therefore needs to have appropriate viscosity at moderate temperatures and must not undergo deterioration when heated to this temperature. In particular, the reactive diluent must not be too volatile at this temperature. Also, it is important that the hardened composition has good heat resistance, that is to say a vitreous transition temperature Tg of more than 250° C. Finally, it is essential to obtain a composite material having good mechanical properties (yield point stress, yield point deformation, elastic modulus).

The amounts of diluent used are chosen in such manner as to optimise these properties in relation to the type of diluent used. Generally, good results are obtained with 20 to 70, preferably 20 to 50, and further preferably with 30 to 40 parts by weight of diluent per 100 parts by weight of maleic resin.

If hydroxyethyl methacrylate (HEMA) is used with the formula:

both the viscosity and heat resistance properties and the mechanical properties are fully satisfactory. On the other hand, this diluent may in some cases have insufficient resistance to evaporation.

If dipentaerythritol pentacrylate is used as reactive diluent, the resistance to evaporation of this diluent is higher, the viscosity properties of the compositions are good and heat resistance of the hardened material is improved since Tg is over 350° C., but the mechanical properties are slightly inferior since the material is too rigid and therefore brittle.

Therefore, in accordance with the invention, in order to improve these mechanical properties, a non-volatile plasticizer may be added to the setting composition.

In this case, the composition preferably comprises 10 to 50 parts by weight of a plasticizer per 100 parts by weight of maleic resin.

This plasticizer may be a thermoplastic resin or a bis-allylic resin. As an example of thermoplastic resins, mention may be made of urethane-acrylate resins.

Preferably, a bis-allylic resin is used as plasticizer.

A further objective of the present invention is a method of manufacture of a composite material comprising a fibrous reinforcement dispersed in an organic matrix, which comprises the following stages:

1) impregnating a fibrous reinforcement with the setting composition described above, at a temperature of 30 to 90° C., and 2) setting the composition by ionization by means of an electron or X ray beam.

The fibrous reinforcement used in this method may be produced by known techniques generally used for the manufacture of products in composite materials, such as flow methods, filament winding, uni and multi-directional draping, preimpregnation, injection etc. Generally cloths preimpregnated with the setting composition are used that are assembled to form the composite material product. Setting is then carried out by ionization by subjection to irradiation by means of an electron or X ray beam. This may be carried out using the ionization polymerization device described in document FR-A-2 564 029.

The fibrous reinforcement may be made up of woven, braided or wound fibres of alumina, glass, or carbon, silicon carbide or carbonitride, boron or aramide alumino-silicate etc.

The doses used to obtain setting are generally in the range of 100 to 350 kGy, preferably between 250 and 350 kGy.

These doses may be obtained by passing the fibrous reinforcement impregnated with the setting composition at a given speed under the electron or X ray beam. This speed is dependent upon the dose and the characteristics of the device; that is to say D=K/V in which D is the irradiation dose expressed in kGy, K is a parameter dependent upon characteristics (energy, power) and upon beam adjustments (scanning frequency, scanning width, impulse frequency), and V represents the speed at which the impregnated reinforcement is passed.

For an electron accelerator of 10 MeV and a power of 10 kW, a dose of 10 kGy corresponds to a speed of 2 m/min.

Since higher doses correspond to very low speeds (6 to 7 cm/min), speeds which are difficult to obtain by industrial means, a distribution of doses is preferably used with successive passes of the mixture under the accelerator. The best compromise is a unit pass of 50 kGy, which corresponds to a speed of 40 cm/min.

Other characteristics and advantages of the invention shall be more clearly understood on reading the following description of non-restrictive examples of an embodiment, given for illustrative purposes, with reference to the appended drawings.

EXAMPLE 1
PREPARATION OF THE BASIC MALEIC RESIN (RADIMID 10).

This resin is prepared using the following constituents:

(a) 4,4'-diphenyl methane-bis-maleimide with the formula:

(15)

(b) 1,3-Toluene-bis-maleimide (TBM) with the formula:

(16)

(c) a mixture of acrylates comprising EBECRYL 150, an acrylate with the formula:

(12)

EBECRYL 629, acrylate itself formed by a mixture of the compounds with the following formulae:

(13)

and (17)

and (d) 1-vinyl-2-pyrrolidone, a catalyser with the formula:

(18)

For this preparation the procedure is as follows:

Stage 1

In a 350 cm$^3$ glass reactor fitter with an anchor-type mixer in stainless steel and preheated by placing said reactor in an oil bath at 165° C, the following mixture is added in 12 minutes while mixing:

165.33 g of N,N'-4,4'-diphenylmethane-bis-maleimide and 69.56 g of N,N'-methyl-4-phenylene-1,3-bis-maleimide.

The mixture is mixed until complete melting of the ingredients added and a homogeneous liquid mass is obtained; this additional mixing time is 5 minutes.

Stage 2

To the homogeneous liquid mass are added 17.82 g of 1-vinyl-2-pyrrolidone and they are left to react while mixing for 5 minutes.

Stage 3

The reactor is removed from the heated oil bath, and to the reactional mass is added a mixture, under continued mixing, of:

26.76 g of EBERCRYL 150 â made by UCB, and 53.53 g of EBECRYL 629 â acrylate compound (mixture of 80% by weight of novolac epoxy diacrylate and of 20% by weight of trimethylolpropane triacrylate).

After adding the acrylate compounds, the reactor contents are left to react under continued mixing for 3 minutes, then the reactional mass is poured into a metal vessel. After cooling to room temperature the basic maleic resin RADIMID 10 is obtained in solid form. Its viscosity at 80° C. is 5.5 Pa.s. This resin is then stored at −18° C. until use.

EXAMPLE 2
SETTING COMPOSITIONS CONTAINING MALEIC RESIN AND HYDROXY ETHYL METHACRYLATE (HEMA).

In this example, setting compositions 1 to 3 as per Table 1 are prepared using maleic resin (RADIMID 10) obtained in example 1 by adding thereto a reactive diluent made up of hydroxyethyl methacrylate HEMA.

For this preparation a reactor with a thermostat bath is used which is heated firstly to 100° C., then the RADIMID 10 resin is added, previously ground, which was stored at −18° C. As soon as the resin reaches the temperature of 110° C., this temperature is maintained for 10 minutes before cooling the resin to 100° C. while maintaining the bath at a temperature of 80° C. The required quantity of HEMA is then added in 4 to 8 minutes while maintaining the bath at 80° C. As soon as the composition reaches 85° C. it is collected for storage.

The viscosity and jar life are then determined at a temperature of 23° C. of 3 compositions in accordance with the invention obtained in this way and which respectively comprise 20 parts by weight of HEMA (composition 1), 30 parts by weight of HEMA (composition 2) and 40 parts by weight of HEMA (composition 3), per 100 parts by weight of RADIMID resin (see Table I).

The jar life is the time during which, at a given temperature, the viscosity of the reactive resin-diluent mixture shows little or no change.

Figure 1:
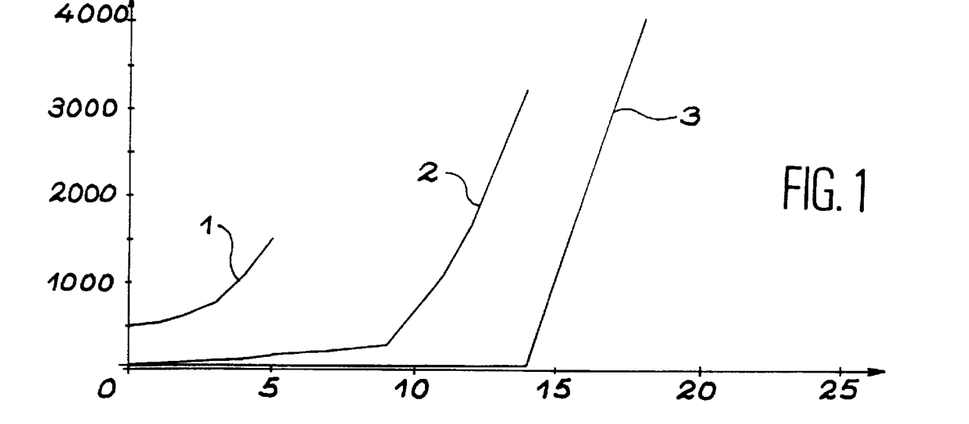
FIG. 1 is a diagram illustrating the development of viscosity in (Pa.s) in relation to time (in days) at 23° C. of setting compositions when HEMA is used as reactive diluent.

The results obtained are given in FIG. 1 which illustrates the viscosity (en Pa.s) at 23° C. in relation to time (in days) of compositions 1, 2 and 3.

In this figure curve 1 refers to composition 1, curve 2 refers to composition 2 and curve 3 refers to composition 3.

It is noticed that the jar life at room temperature is greater the higher the HEMA content. Jar life values are:

1 day for composition 1,
9 days for composition 2, and
14 days for composition 3.

Also, the initial viscosities at 23° C. are as follows:
Composition 1: 560 Pa.s
Composition 2: 64 Pa.s
Composition 3: 15 Pa.s

EXAMPLE 3
PREPARATION OF COMPOSITE MATERIALS USING RADIMID-HEMA COMPOSITIONS

In this example, composite materials are prepared using uni-dimensional cloths of carbon fibres (T800-H). Firstly, preimpregnation is carried out using setting compositions 1, 2 and 3 of example 2. Then sheets are prepared using the preimpregnated cloths by stacking 16 cloths at 0° C. After compressing the cloths they are subjected to polymerization by ionization using an electron accelerator applying a dose of 300 kGy, through successive passes at a dose of 50 kGy.

The conditions of impregnation and the mechanical properties of the composites obtained are given in Table 2 below.

EXAMPLE 4
SETTING COMPOSITION CONTAINING MALEIC RESIN AND PENTACRYLATE (COMPOSITION 4).

In this example, the same operating method is followed as in example 2 to prepare an ionization-setting composition using the RADIMID 10 resin of example 1, but using dipentaerythritol pentacrylate RCP 3048 as reactive diluent with the formula:

(19)

in the proportion of 40 parts by weight per 100 parts by weight of resin.

A setting composition is obtained having suitable viscosity and acceptable lifetime.

Figure 2:
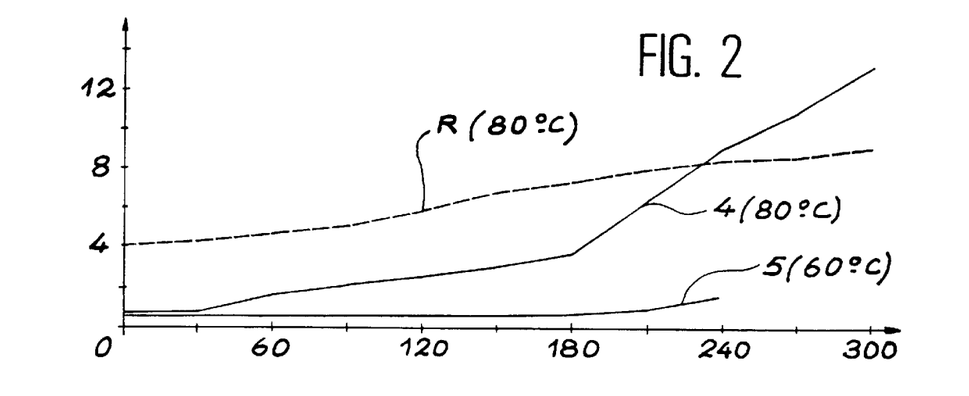
FIG. 2 is a diagram illustrating the development of viscosity (in Pa.s) in relation to time (in minutes) of various setting compositions.

The viscosity of this composition at 80° C. in relation to time is illustrated in FIG. 2 (curve 4). In this figure, curve R given for comparison refers to Radimid resin alone at 80° C.

EXAMPLE 5
SETTING COMPOSITION CONTAINING MALEIC RESIN, PENTACRYLATE AND HEMA (COMPOSITION 5).

The same operating method is followed as in example 2 to prepare a composition comprising per 100 parts by weight of RADIMID 10 resin of example 1: 40 parts by weight of RCP 3048 pentacrylate and 30 parts by weight of HEMA.

The development of viscosity (in Pa.s) at 60° C. in relation to time (in minutes) of this composition is illustrated in FIG. 2 (curve 5). The viscosity of this composition is much inferior to that of RADIMID 10 resin alone and of composition 4.

In Table 1 the weight compositions of the compositions prepared in examples 1 to 5 have been grouped together.

EXAMPLE 6
MECHANICAL PROPERTIES OF COMPOSITIONS SET BY IONISATION

In this example, compositions 2, 3 and 4 are set by ionization using a dose of 300 kGy with successive passes of 50 kGy as in example 3.

For set compositions 2 and 4 thus obtained, yield point stress, yield point deformation and elastic modulus are calculated.

These results are given in Table 2 below.

It will be noticed that the mechanical properties are weaker when pentacrylate RCP 3048 is used as reactive diluent instead of hydroxyethyl methacrylate.

As will be seen below, these properties may be improved by adding a plasticizer to the setting composition.

Figure 3:
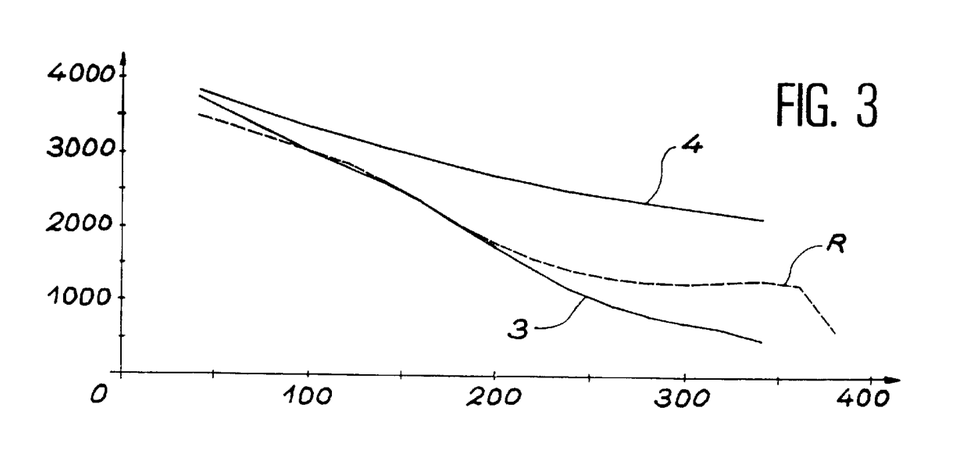
FIG. 3 is a diagram representing the development of the elastic modulus (in MPa) in relation to temperature (in °C.) of composite materials prepared with compositions of the invention.

FIG. 3 shows the development of the elastic modulus (in MPa) of set compositions 3 and 4 in relation to temperature (in °C.).

By way of comparison, this figure also indicates the elastic modulus of the RADIMID 10 resin alone set under the same conditions.

In this figure, curve 3 refers to setting composition 3, curve 4 to setting composition 4 and curve R to the RADIMID 10 maleic resin alone.

It will be observed that heat resistance is much higher when pentacrylate RCP 3048 is used as reactive diluent.

EXAMPLE 7
PREPARATION OF COMPOSITE MATERIALS USING COMPOSITIONS 2 and 4.

The same operating method is followed as in example 3 to prepare composite materials using setting compositions 2, 4 and 5, a dose of 300 kGy being used in successive passes of 50 kGy to achieve setting.

Figure 4:
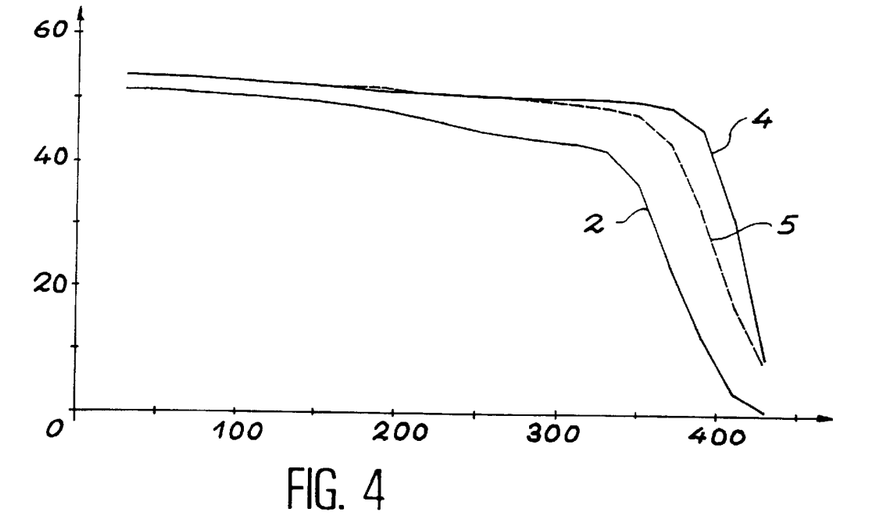
FIG. 4 is a diagram illustrating the development of the elastic modulus (in GPa) in relaiton to temperature (in °C.) of compositions according to the invention set by ionization.

FIG. 4 shows the development of the elastic modulus (in GPa) of the composites obtained in relation to temperature (in °C.). Curves 2, 4 and 5 refer to the composites using compositions 2, 4 and 5 respectively.

It will be noticed that, for the composites, the mechanical properties deteriorate after 300° C. when HEMA is used as reactive diluent (curve 2), whereas for pentacrylate (curves 4 and 5) heat resistance is good up to a temperature of over 350° C.

EXAMPLE 8
SETTING COMPOSITION COMPRISING A PLASTICIZER

In this example a new ionization-setting composition is prepared using the same operating method as in example 4 but adding, in addition, 20 parts by weight of a plasticizer (bis-allylic resin) per 100 parts by weight of maleimide resin. In this way composition 6 is obtained which has the following weight composition:

100 parts of RADIMID 10 resin, 40 parts of pentacrylate RCP 3048 and 20 parts of bis-allylic resin TM121 with the formula:

(20)

This composition is also given in Table 1.

The mechanical properties of this composition are then determined after setting by ionization with a dose of 300 kGy in successive passes of 50 kGy. The results obtained are given in Table 3. It will be observed in this table that the performance of composition 6 is substantially equivalent to that of composition 2.

Therefore the presence of the plasticizer improves the mechanical properties of the compositions which use pentacrylate making them less brittle.

Figure 5:
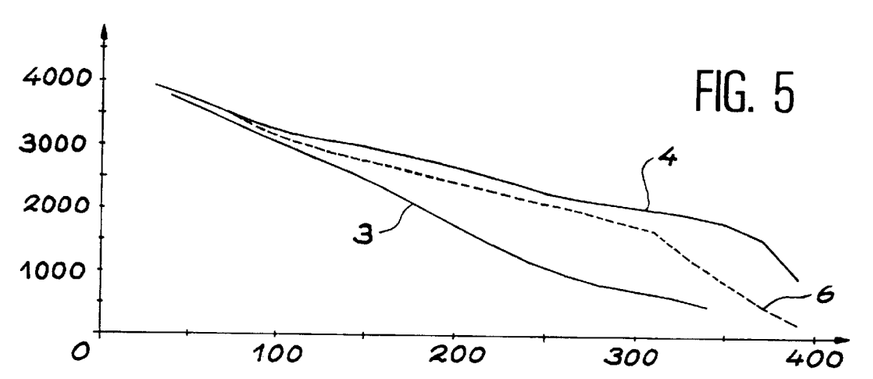
FIG. 5 is a diagram illustrating the development of the elastic modulus (in MPa) in relation to temperature (in °C.) of compositions according to the invention set by ionization.

FIG. 5 shows the change in the elastic modulus in (MPa) in relation to temperature (°C.) for composition 6 (curve 6) set under a dose of 300 kGy. In this figure, curves 3 and 4 illustrate the results obtained under the same conditions with compositions 3 and 4 set with a dose of 300 kGy.

Figure 6:
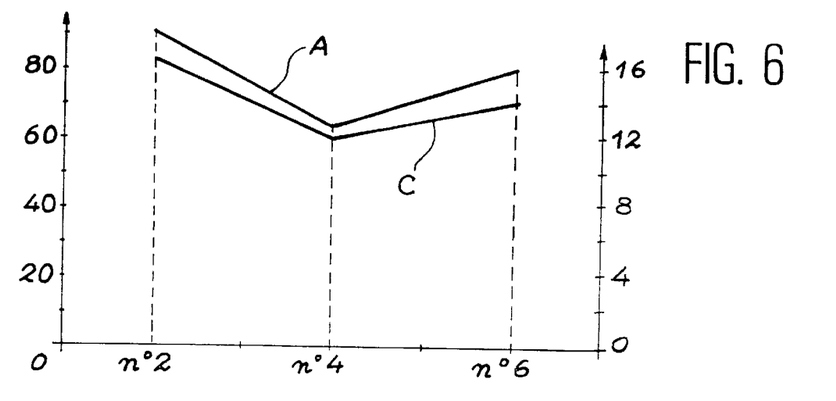
FIG. 6 is a graph illustrating the yield point stress and elongation values of the three compositions according to the invention set by ionization.

FIG. 6 illustrates in graph form the results of Table 2, with respect to yield point stress (in MPa) (graph C) and yield point elongation (in %) (graph A).

On this graph it will be observed that the best results are obtained with compositions 2 and 6.

TABLE 1

| Composition | RADIMID 10 (maleic resin of example 1) | Hydroxyethyl methacrylate (HEMA) | Pentacrylate (RCP 3048) | Bis-allylic (TM121) |
|---|---|---|---|---|
| N° 1 | 100 | 20 | | |
| N° 2 | 100 | 30 | | |
| N° 3 | 100 | 40 | | |
| N° 4 | 100 | | 40 | |
| N° 5 | 100 | 30 | 40 | |
| N° 6 | 100 | | 40 | 20 |

TABLE 2

| | Composition | | | |
|---|---|---|---|---|
| | N° 1 | N° 2 | N° 3 | |
| Viscosity (Pa · s) at 23° C. | 560 | 64 | 15 | Composition alone |
| Impregnation Temperature | 45° C. | 28° C. | 23.5° C. | |
| Jar life | <17 h | >24 h | >24 h | |
| Vitreous Transition (Tg) | >250° C. | >250° C. | >250° C. | |
| Stress Strain (Mpa) | 1950 | 1960 | 1560 | Composite |
| Modulus (Gpa) | 160 | 145 | 154 | |
| Shearing Stress (MPa) | 70 | 79 | 55 | |

TABLE 3

| Composition | Yield point stress (MPa) | Yield point deformation (%) | Elastic modulus (MPa) |
|---|---|---|---|
| 2 | 82 | 1.90 | 4200 |
| 4 | 60 | 1.30 | 4200 |
| 6 | 72 | 1.62 | 4340 |

We claim:

1. A composition which can be set by ionizing radiation comprising a maleic resin and a reactive diluent made up of at least one compound selected from the group consisting of dipentaerythritol pentacrylate and hydroxyethyl methacrylate, the total quantity of reactive diluent being between 10 and 70 parts by weight per 100 parts by weight of maleic resin, wherein said maleic resin is the product resulting from the reaction of the following constituents:

(a) a N,N'-bis-maleimide with the formula (I):

in which:

the Z symbols, identical or different, each represent $CH_3$ or Cl;

the A symbol represents a single bond or a group selected from the group consisting of: $-CH_2-$; $-C-(CH_3)_2-$, $-O-$, $-S-$ and $-SO_2-$;

(b) at least one maleimide selected from the group consisting of compounds of the formulae:

-continued (8)

(9)

(12)

-continued (10)

(11)

(c) an acrylate reagent consisting of one or more compounds of the general formula:

$$(CH_2=CR_1-CO-O)n----G \quad (II)$$

in which:
the symbol $R_1$ denotes a hydrogen atom or a methyl radical;
n denotes a whole or fractional number equal to at least 1 and not exceeding 8;
the symbol G denotes an organic radical of valiency n derived: from a linear or branched, saturated aliphatic residue containing from 1 to 30 carbon atoms and capable of containing one or a number of oxygen bridge(s) and/or one or a number of free hydroxyl functional group(s); from an aromatic residue (of aryl or arylaliphatic moiety) containing from 6 to 150 carbon atoms, consisting of a benzene nucleus, capable of being substituted by one to three alkyl radicals containing from 1 to 5 carbon atoms or by a number of benzene nuclei, which are optionally substituted as indicated above, which are joined to each other by a single valency bond, an inert group or an alkylene radical containing from 1 to 3 carbon atoms, it being possible for the said aromatic residue to contain in various places of its structure one or a number of oxygen bridge(s) and/or one or a number of free hydroxyl functional group(s), it being possible for the free valency (valencies) of the aromatic radical G to be carried by a carbon atom of an aliphatic chain and/or by a carbon atom of a benzene nucleus; and
(d) a reagent comprising a vinyl double bond selected from the group consisting of vinylpyridines, N-vinyl-2-pyrrolidone, vinyltetrahydrofuran, styrene and mixtures thereof.

2. Composition in accordance with claim 1, in which constituent (a) is 4,4'-diphenyl methane-bis-maleimide, constituent (b) is 1.3-toluene-bis-maleimide, constituent (c) is a mixture of the following acrylates:

the acrylate with the formula:

the acrylate with the formula:

(13)

the triacrylate of propane trimethylol,
and constituent (d) is 1-vinyl-2-pyrrolidone.

3. Composition in accordance with claim 2, comprising 20 to 50 parts by weight of reactive diluent per 100 parts by weight of maleic resin.

4. Composition in accordance with claim 1, comprising 20 to 50 parts by weight of reactive diluent per 100 parts by weight of maleic resin.

5. Composition in accordance with claim 1, further comprising 10 to 50 parts by weight of a plasticizer per 100 parts by weight of maleic resin.

6. Composition in accordance with claim 5, in which the plasticizer is a bis-allylic resin.

7. Composition in accordance with claim 6, comprising 40 parts by weight of dipentaerythritol pentacrylate and 20 parts by weight of bis-allylic resin per 100 parts by weight of maleic resin.

8. Composition in accordance with claim 1, wherein the reactive diluent is dipentaerythritol pentacrylate.

9. Composition in accordance with claim 1, wherein the reactive diluent is hydroxyethyl methacrylate.

10. Method of manufacture of a composite material comprising a fibrous reinforcement dispersed in an organic matrix, characterized in that it comprises the following stages:
1) impregnating a fibrous reinforcement with an ionization-setting composition as defined in claim 1 at a temperature of 30° to 90° C., and
2) setting the composition by ionization by means of an electron or X ray beam.

11. Method in accordance with claim 10, in which the ionization dose used in stage 2 is 100 to 350 kGy.

12. Method in accordance with claim 9, in which the fibrous reinforcement comprises carbon fibres.

13. Method in accordance with claim 10, in which constituent (a) is 4,4'-diphenyl methane-bis-maleimide, constituent (b) is 1,3-toluene-bis-maleimide, constituent (c) is a mixture of the following acrylates:

the acrylate with the formula:

the acrylate with the formula:

the triacrylate of propane trimethylol, and constituent (d) is 1-vinyl-2-pyrrolidone.

14. Method in accordance with claim 10, in which the setting composition comprises 20 to 50 parts by weight of reactive diluent per 100 parts by weight of maleic resin.

15. Method in accordance with claim 10, in which the setting composition also comprises 10 to 50 parts by weight of a plasticizer per 100 parts by weight of maleic resin.

16. Method in accordance with claim 15, in which the plasticizer is a bis-allylic resin.

17. Method in accordance with claim 16, in which the setting composition comprises 40 parts by weight of dipentarerythritol pentacrylate and 20 parts of bis-allylic resin per 100 parts by weight of maleic resin.

18. Method in accordance with claim 10, wherein the reactive diluent is dipentaerythritol pentacrylate.

19. Method in accordance with claim 10, wherein the reactive diluent is hydroxyethyl methacrylate.

* * * * *